US008291064B2

(12) United States Patent
Lake

(10) Patent No.: US 8,291,064 B2
(45) Date of Patent: Oct. 16, 2012

(54) METHOD, SYSTEM AND PROGRAM PRODUCT FOR OPTIMIZING EVENT MONITORING FILTER SETTINGS AND METRIC THRESHOLD

(75) Inventor: John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 11/094,930

(22) Filed: Mar. 31, 2005

(65) Prior Publication Data

US 2006/0221848 A1   Oct. 5, 2006

(51) Int. Cl.
*G06F 15/173* (2006.01)
(52) U.S. Cl. ......... 709/224; 709/223; 709/203; 370/252
(58) Field of Classification Search ........... 709/223–224
See application file for complete search history.

(56) References Cited

U.S. PATENT DOCUMENTS

| | | | |
|---|---|---|---|
| 5,404,532 A | | 4/1995 | Allen et al. |
| 5,555,191 A | * | 9/1996 | Hripcsak ................... 709/224 |
| 6,118,936 A | * | 9/2000 | Lauer et al. ................ 709/224 |
| 6,367,034 B1 | | 4/2002 | Novik et al. |
| 6,438,618 B1 | | 8/2002 | Lortz et al. |
| 6,658,486 B2 | | 12/2003 | Buzbee et al. |
| 6,675,128 B1 | * | 1/2004 | Hellerstein ................ 702/182 |
| 6,742,143 B2 | | 5/2004 | Kaler et al. |
| 2002/0010804 A1 | | 1/2002 | Sanghvi et al. |
| 2002/0042847 A1 | | 4/2002 | Takats et al. |
| 2002/0143908 A1 | | 10/2002 | Taggart et al. |
| 2003/0121027 A1 | | 6/2003 | Hines |
| 2003/0131143 A1 | | 7/2003 | Myers |

OTHER PUBLICATIONS

Stephen Hochstetler; Ghufran Shah; Jamie Carl; Jason Shamroski; John Willis; Murilo Goncalves Aguiar, "IBM Tivoli Monitoring Version 5.1: Advanced Resource Monitoring", Oct. 2002, ibm.com/redbooks, all pages.*
IMB Tivoli, "TDS for Event Management 1.0.1 Release Notes", Jul. 1999, IBM Tivoli, Version 1.1, all pages.*
Eur Ing Keith Armstrong, "What EMC is, and Some Examples of EMC Problems Caused by Software", Nov. 12, 1998, Electomagnetic compatiblity of Software (Ref. No. 1998/471), IEEE Colloquium on Nov. 12, 1998, pp. 1/1-1/10.*
IBM Technical Disclosure Bulletin, "Method for Minimizing the Information Difference Between Active and Log-Based Recovery in Transaction Systems Using Incremental Instead of Periodic Checkpointing", vol. 30, No. 3, Aug. 1987, pp. 1340-1346.
IBM Research Disclosure No. 432171, "Server Monitor History Correlating Error to Operational Server Status", Apr. 2000, pp. 773-774.

* cited by examiner

*Primary Examiner* — Hua Fan
(74) *Attorney, Agent, or Firm* — Lee Law, PLLC; Christopher B. Lee

(57) ABSTRACT

Under the present invention indications of an event are monitored based upon a comparison of a computer system metric to a corresponding metric threshold over time. It is then determined whether a predetermined probability is reached that the indications will persist at least as long as a minimum detection and repair time for the event. Determining whether the predetermined probability is reached is typically accomplished based upon the monitoring of the indications over time and historical data for past instances of the event. The present invention will then optimize the filter setting for the event to minimize false positives and optimize the metric threshold so that indications are more accurately monitored.

27 Claims, 2 Drawing Sheets

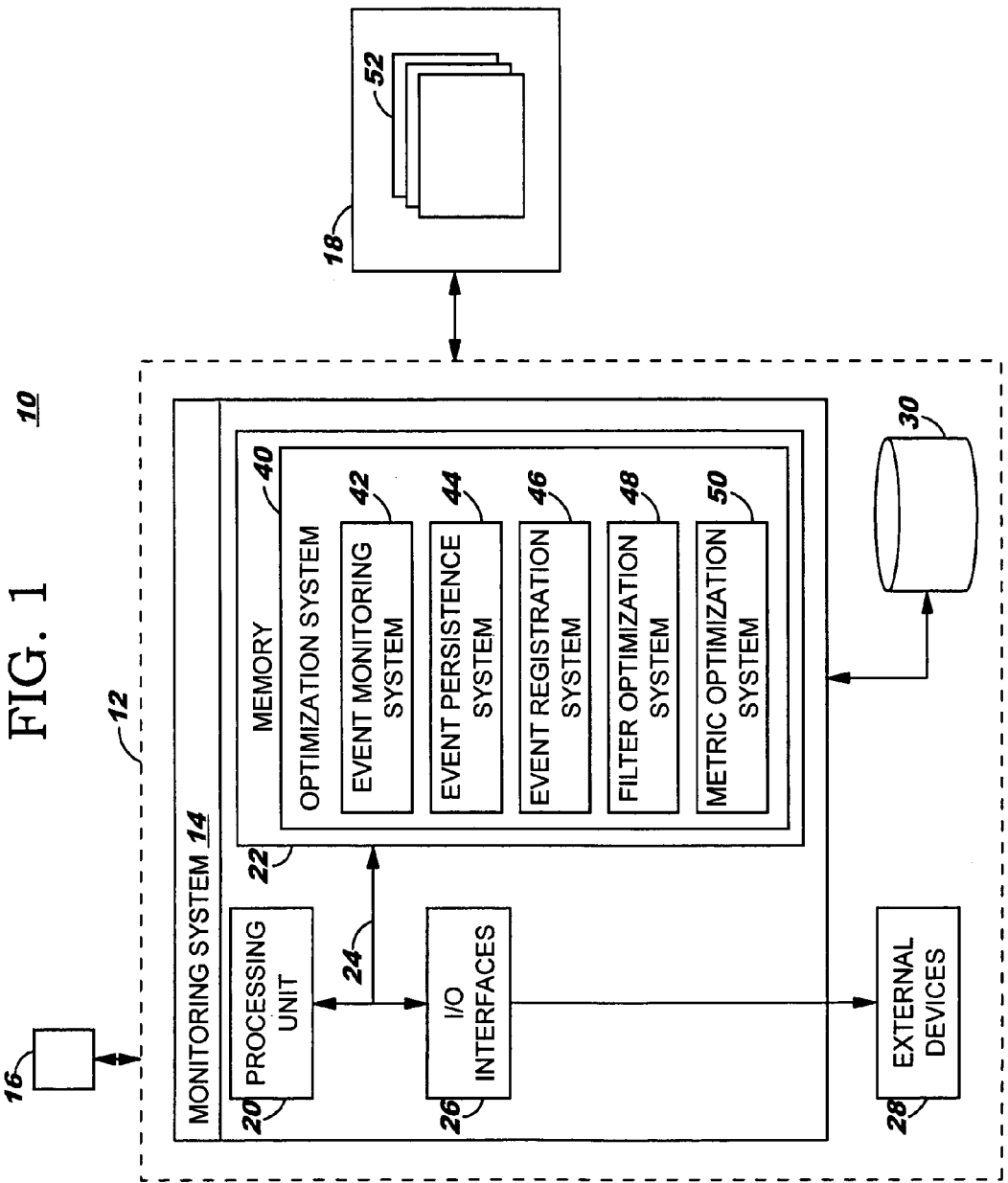

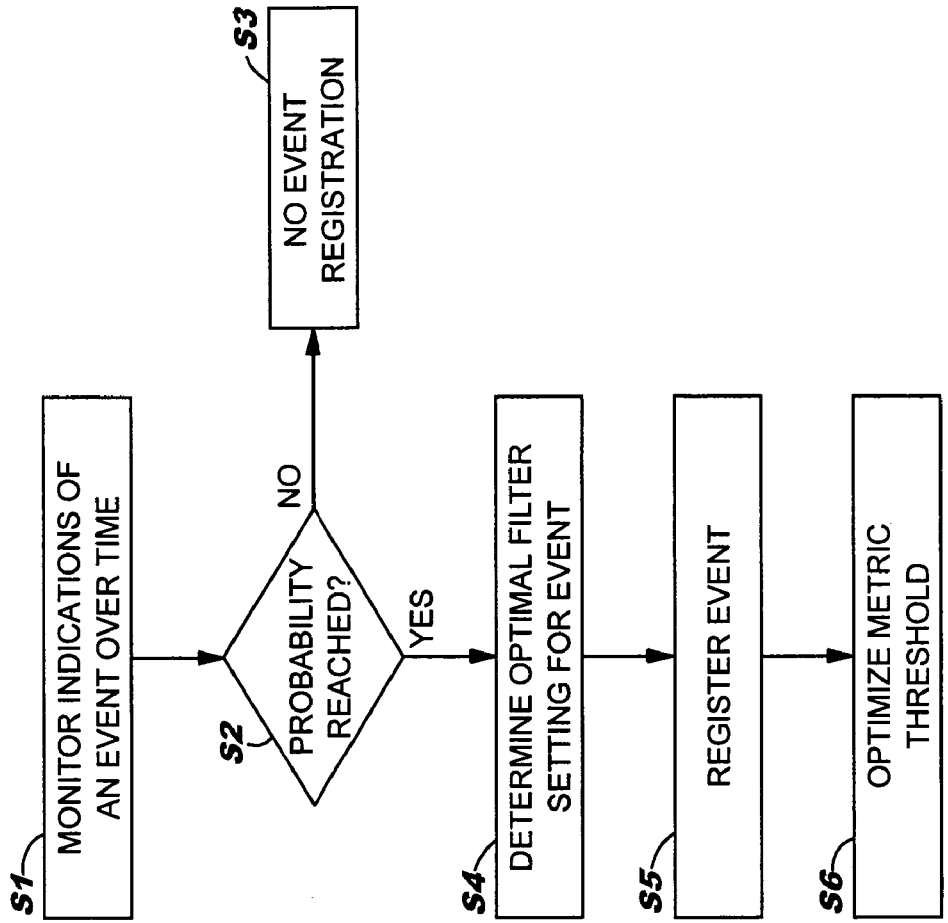

METHOD, SYSTEM AND PROGRAM PRODUCT FOR OPTIMIZING EVENT MONITORING FILTER SETTINGS AND METRIC THRESHOLD

BACKGROUND OF THE INVENTION

1. Field of the Invention

The present invention generally relates to computer system monitoring. Specifically, the present invention relates to a method system and program product for optimizing event monitoring filter settings and metric thresholds.

2. Related Art

As computer infrastructures continue to grow in size and functionality, system monitoring is becoming an increasingly important function. For example, many organizations utilize data centers that can include any quantity (e.g., 1000) of computer systems or machines. In such data centers, each computer system will typically process a workload. As such, each system has hard error states where no processing occurs, and soft error states where processing occurs slowly. In general, the soft error states tend to be more transient meaning they tend to dissipate or self-clear. With any error state, however, there is a minimum (feasible) detection and repair time that reflects the business value of a system and the workload it processes, the simplicity of the underlying problem, the disruptiveness of the repair procedure, and other factors.

To ensure adequate operation of such infrastructures, monitoring systems are continually being developed to detect error states (also referred to as "events"). One example of a currently available monitoring system is "IBM Tivoli Monitoring" (ITM) by International Business Machines Corp. of Armonk, N.Y. One issue encountered by any monitoring system is the registration of false events. Specifically, an ideal monitoring system will only register a truly positive event. The registration of false events leads to wasted time and resources. To help avoid the registration of false events monitoring systems such as ITM can utilize filters.

Unfortunately, determining optimal settings for such filters is currently an ad hoc procedure and is not driven from a principled approach. As such, there is currently great difficulty in predicting the behavior of any given filter setting. This leaves unanswered the questions surrounding false positives (e.g., too many events that require no action) and false negatives (e.g., missed events that could require action). This typically leads to conservative filter configurations, leading to an "event flood" (i.e., a constant stream of events), most of which are ignored. Current monitoring systems are thus driven by end-user complaints, which are used to sift through the flood of events to determine which events probably require action and which events may still be safely ignored.

In view of the foregoing, there exists a need for a method system and program product for optimizing event monitoring filter settings so that events that truly require action can be readily identified.

SUMMARY OF THE INVENTION

In general, the present invention provides a method, system and program product for optimizing event monitoring filter settings and metric thresholds. Specifically, under the present invention indications of an event are monitored/detected based upon a comparison of a computer system metric to a corresponding metric threshold over time. It is then determined whether a predetermined probability is reached that the indications will persist at least as long as a minimum detection and repair time for the event. Determining whether the predetermined probability is reached is typically accomplished based upon the monitored indications and historical data for past instances of the event. For example, an administrator might wish the event to be registered only if there is at least a 75% chance (i.e., the predetermined probability) that the minimum detection and repair time will be reached or exceeded. Moreover, the historical data might indicate that when indications for the event persisted for 3 minutes in the past, there was a 75% chance that the minimum detection and repair time would be reached or exceeded. Thus, if the current indications persist for 3 minutes, the present invention will determine that the predetermined probability of 75% is reached. The present invention will also determine an optimal filter setting for the event so that it will be registered only when the predetermined probability is reached. Still yet, the present invention can also optimize the metric threshold based on historical data so that indications are more accurately monitored.

A first aspect of the present invention provides a method for optimizing event monitoring filter settings, comprising: monitoring indications of an event over time; obtaining a minimum detection and repair time for the event; and determining an optimal filter setting for registering the event based on the minimum detection and repair time.

A second aspect of the present invention provides a method for optimizing event monitoring filter settings, comprising: monitoring indications of an event based upon a comparison of a computer system metric to a corresponding metric threshold over time; determining whether a predetermined probability is reached that the indications will persist at least as long as a minimum detection and repair time for the event, wherein the step of determining whether the predetermined probability is reached is based upon the monitoring of the indications over time and historical data for past instances of the event; and determining an optimal filter setting for the event so that the event will be registered only if the predetermined probability is reached.

A third aspect of the present invention provides a system for optimizing event monitoring filter settings, comprising: an event monitoring system for monitoring indications of an event; an event persistence system for determining whether a predetermined probability is reached that the indications will persist at least as long as a minimum detection and repair time for the event; and a filter optimization system for determining an optimal filter setting for the event so that the event will be registered only if the predetermined probability is reached.

A fourth aspect of the present invention provides a method for deploying an application for optimizing event monitoring filter settings, comprising: providing a computer infrastructure being operable to: monitor indications of an event; determine whether a predetermined probability is reached that the indications will persist at least as long as a minimum detection and repair time for the event; and determine an optimal filter setting for the event so that the event will be registered only if the predetermined probability is reached.

A fifth aspect of the present invention provides computer software embodied in a propagated signal for optimizing event monitoring filter settings, the computer software comprising instructions to cause a computer system to perform the following functions: monitor indications of an event; determine whether a predetermined probability is reached that the indications will persist at least as long as a minimum detection and repair time for the event; and determine an optimal filter setting for the event so that the event will be registered only if the predetermined probability is reached.

Therefore, the present invention provides a method system and program product for optimizing event monitoring filter settings and metric thresholds.

BRIEF DESCRIPTION OF THE DRAWINGS

FIG. 1 shows an illustrative system for optimizing event monitoring filter settings and metric thresholds according to the present invention.

FIG. 2 shows an illustrative method flow diagram according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE DRAWINGS

As indicated above, the present invention provides a method, system and program product for optimizing event monitoring filter settings and metric thresholds. Specifically, under the present invention indications of an event are monitored/detected based upon a comparison of a computer system metric to a corresponding metric threshold over time. It is then determined whether a predetermined probability is reached that the indications will persist at least as long as a minimum detection and repair time for the event. Determining whether the predetermined probability is reached is typically accomplished based upon the monitored indications and historical data for past instances of the event. For example, an administrator might wish the event to be registered only if there is at least a 75% chance (i.e., the predetermined probability) that the minimum detection and repair time will be reached or exceeded. Moreover, the historical data might indicate that when indications for the event persisted for 3 minutes in the past, there was a 75% chance that the minimum detection and repair time would be reached or exceeded. Thus, if the current indications persist for 3 minutes, the present invention will determine that the predetermined probability of 75% is reached. The present invention will also determine an optimal filter setting for the event so that it will be registered only when the predetermined probability is reached. Still yet, the present invention can also optimize the metric threshold based on historical data so that indications are more accurately monitored.

Referring now to FIG. 1, a system 10 for optimizing event monitoring filter settings and metric thresholds according to the present invention is shown. As depicted, system 10 includes a computer infrastructure 12, which comprises a monitoring (computer) system 14 that can perform the various process steps described herein. As further depicted, computer infrastructure 12 is in communication with target infrastructure 18. In general, target infrastructure 18 is intended to represent any type of computer infrastructure/environment that is being monitored. For example, target infrastructure 18 can comprise a data center as described above. To this extent, target infrastructure 18 includes computer systems/machines 52 that will be monitored for events.

Monitoring system 14 is intended to represent any type of computer system capable of carrying out the teachings of the present invention. For example, monitoring system 14 could be a laptop computer, a desktop computer, a workstation, a handheld device, a server, etc. In addition, as will be further described below, monitoring system 14 can be deployed and/or operated by a service provider that optimizes filter settings and metric thresholds for customers. It should be understood that although shown within two different computer infrastructures 12 and 18, monitoring system 14 and computer systems 52 could actually exist within the same computer infrastructure. Two distinct infrastructures are shown to illustrate that the monitoring and optimization functions of the present invention could be performed by a party who is independent of target infrastructure 18 such as a service provider or the like.

In any event, communication between infrastructures 12 and 18 could occur over a network (e.g., the Internet, a wide area network (WAN), a local area network (LAN), a virtual private network (VPN), etc. via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. In addition, it should be understood that administrator 16 can directly access monitoring system 14 as shown, or administrator 16 could operate a separate computer system that communicates with monitoring system 14 over a network.

Under the present invention, optimization of event monitoring filter settings and computer system metric thresholds are provided. To provide this functionality, optimization system 40 is shown implemented on monitoring system 14 as computer program code. To this extent, monitoring system 14 is shown including a processing unit 20, a memory 22, a bus 24, and an input/output (I/O) interfaces 26. Further, monitoring system 14 is shown in communication with external I/O devices/resources 28 and one or more storage systems 30. In general, processing unit 20 executes computer program code, such as optimization system 40, that is stored in memory 22 and/or storage system(s) 30. While executing computer program code, processing unit 20 can read and/or write data, to/from memory 22, storage system(s) 30, and/or I/O interfaces 26. Bus 24 provides a communication link between each of the components in monitoring system 14. External devices 28 can comprise any devices (e.g., keyboard, pointing device, display, etc.) that enable a user to interact with monitoring system 14 and/or any devices (e.g., network card, modem, etc.) that enable monitoring system 14 to communicate with one or more other computing devices, such as those in target infrastructure 18 and/or operated by administrator 16.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, monitoring system 14 is only representative of various possible computer infrastructures that can include numerous combinations of hardware. For example, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in monitoring system 14. However, if monitoring system 14 comprises a handheld device or the like, it is understood that one or more I/O devices 28 (e.g., a display) and/or storage system(s) 30 could be contained within monitoring system 14, not externally as shown.

Storage system 30 can be any type of system (e.g., a database) capable of providing storage for information under the present invention. As will be further described below, such information can include historical data used to implement the present invention. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into monitoring system 14. Moreover, although not shown for brevity purposes, and any computer system operated by administrator 16 will likely contain computerized components similar to monitoring system 14.

Shown in memory 22 of monitoring system 14 is optimization system 40, which includes event monitoring system 42, event persistence system 44, event registration system 46, filter optimization system 48 and metric optimization system 50. Operation of each of these systems is discussed further below. However, it is understood that some of the various systems shown in FIG. 1 can be implemented independently, combined, and/or stored in memory for one or more separate computers systems that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems. It should also be understood that optimization system 40 can include or be incorporated within, or used in conjunction with, any system monitoring software program now known or later developed. For example, optimization system 40 can be used to augment ITM.

Before the primary teachings of the present invention are described in greater detail, a description of event monitoring filters according to the present invention will be given. As is the case with ITM event persistence filters, the filters of the present invention utilize notion of "occurrences" and "non-occurrences or holes" to describe event persistence criteria. An occurrence is an interval of time during which an indication of an event is raised; a non-occurrence or hole is an interval of time during which an indication is not raised. ITM promotes a series of indications into an event when an appropriate number of occurrences are observed, each of which is separated by no more than a designated number of holes. For example, if administrator 16 designated occurrences and holes settings of 3 and 1, respectively, the following events and/or non-events would be yielded:

| Observation Sequence | Judgment | Explanation |
| --- | --- | --- |
| O, O, O | Persistent Event (Alert raised) | The required number of occurrences (3) was observed. |
| O, H, O, H, O | Persistent Event (Alert raised) | The required number of occurrences (3) was observed separated by no more than the allowed number of holes (1). |

-continued

| Observation Sequence | Judgment | Explanation |
| --- | --- | --- |
| O, H, O, H, H | Transient Event (No alert raised) | The number of allowed holes was exceeded after the second occurrence. |

A core concept of the present invention is the exploitation of a pragmatic definition of "false positive." Under the present invention, a false positive event is present if the interval from the first indication of the event to the last indication of the event is smaller than the minimum "feasible" detection and repair time. For each occurrence and possible occurrence/hole setting, the present invention creates a tuple of <true/false neg/pos, occurrences, holes> by determining whether the (occurrences, holes) setting would create:

A true positive (an indication that is declared to have persisted longer than the minimum detection and repair time);

A true negative (an indication that does not persist and is not re-raised);

A false positive (an indication that persists, clears, and is not re-raised); or A false negative (an indication that does not persist but is re-raised). Under one embodiment of the present invention, an optimal filter setting can be selected that maximizes the probability that an indication will persist at least as long as the minimum detection investigation and repair time, without regard to the true negatives/false classifications. In another embodiment, optimal filter settings can be those whose occurrences+holes≦N, where N=(minimum detection and repair time)/(time between samples). Based on this latter approach, the present invention computes/determines the setting that maximizes the "trues" while minimizing the "falses" and occurrences*(holes−1)+1. This also applies to settings where neither holes nor an analogous concept is employed by setting allowed holes to zero.

To illustrate these concepts more clearly, reference is made to optimization system 40 of FIG. 1. As computer systems 52 operate, event monitoring system 42 will monitor computer systems 52 over time for indications of an event. In general, indications are monitored or detected based upon a comparison of a computer system metric to a corresponding metric threshold over time. For example, one type of computer system metric that event monitoring system 42 could monitor could be CPU utilization of each computer system 52. If the CPU utilization for a given computer system 52 goes above some corresponding metric threshold (e.g., 50%), an indication is present and will be monitored accordingly. As will be further described below, metric thresholds are commonly set by administrator 16 or the like based on any number of factors such as policies, historical data, etc. However, the present invention will also optimize the metric threshold so that indication monitoring is improved.

In any event, as event monitoring system 42 monitors indications over time, event persistence system 44 will determine (based on historical data) whether a predetermined probability is reached that the indications will persist at least as long as a minimum detection and repair time for the event. Specifically, based on any factor such as policies, rules, historical data, etc., administrator 16 can designate a predetermined probability as well as a minimum repair time for various events. For example, an event of CPU utilization going over a given metric threshold (e.g., 50%) might historically take 15 minutes to detect and repair. In this case, the minimum detection and repair time for this event could be set at 15 minutes. Once indications for this event have been monitored for 15 minutes or longer, the event would be considered a "true positive" event. The predetermined probability allows a "safety" factor to be built in so that the event can be caught before this occurs without taking unnecessary actions. For example, administrator 16 might want the event to be "registered" if there is a 75% chance that the minimum detection and repair time of 15 minutes will be reached or exceeded.

To determine whether the predetermined probability will be reached, historical data (e.g., for the particular event) is used. For example, historical data might state that when indications of previous CPU over-utilization events were received for 3 minutes, the minimum detection and repair time was reached or exceeded 75% of the time. This historical percentage value could change the longer that indications were monitored. For example, the historical data could go on to state that when such indications were monitored for 5 minutes in the past, the minimum detection and repair time was reached or exceeded 80%; and when the indications were monitored for 10 minutes or longer in the past, the minimum detection and repair time was reached or exceeded 100% of the time.

Thus, assume in this example, that the predetermined probability was set at 75% and that the minimum detection and repair time was set at 15 minutes. In this case, event persistence system 44 would determine that the predetermined probability was reached after indications were monitored for 3 minutes. In setting the predetermined probability and the minimum detection and repair time under the present invention, any methodology could be used. For example, a computer-based interface page comprised of fields, menus, buttons and the like could be provided (e.g., by event persistence system 44) to allow administrator 16 to manually set these values. Alternatively, event persistence system 44 could be configured to automatically set these values based on rules, policies, historical data, etc.

In any event, if the predetermined probability is reached that the indications will persist for at least as long as the minimum detection and repair time, event registration system 46 will register the event. Registration of the event can include, among other things, generation and transmission of an alert or the like to administrator 16 or any other applicable parties.

In addition to providing the monitoring and registration functions described, filter optimization system 48 of the present invention will determine an optimal filter setting that can be applied to future instances of the event. To optimize the filter setting, filter optimization system 48 can employ any number of means. For example, as indicated above, filter optimization system 48 can determine an arrangement of occurrences and non-occurrences or holes so that the predetermined probability is not exceeded (i.e., so that the event will be registered only if the predetermined probability is reached). As indicated above, an occurrence is an interval of time during which one or more indications of an event are present, while a non-occurrence or hole is an interval of time during which an indication is not present. Using the above example, the predetermined probability was reached at the 3 minute mark. As such, filter optimization system 48 can determine an arrangement of O's and H's so that the filter matches the 3 minute time span, while still complying with any applicable rules (e.g., such as a particular required ratio of O's to H's, etc.). This filter can then be applied to future instances of the event to ensure highly accurate registration rates. That is, by applying this optimal filter setting to future instances of the event, the likelihood of early or late responses is reduced or eliminated entirely.

In another embodiment, filter optimization system 48 can determine the optimal filter setting for the event such that occurrences+holes<N, where N=(minimum detection and repair time)/(time between samples). Based on this latter approach, the present invention computes/determines the setting that maximizes the "trues" while minimizing the "falses" and occurrences*(holes−1)+1. This also applies to settings where neither holes nor an analogous concept is employed by setting allowed holes to zero.

As further shown in FIG. 1, the present invention provides metric optimization system 50 so that the metric threshold by which indications are realized can be optimized as well. Specifically, the present invention presumes a rule of the form of:

if (VALUE≧THETA) then RaiseAlert(eventName, eventData)

where VALUE is the computer system metric, THETA is a corresponding metric threshold. Using the example of CPU utilization set forth above, VALUE could be 60% and THETA could be 50%. In this case, eventName could be CPU utilization and eventData could be the top five processes currently in operation.

We present the operation of the invention in terms of a rule system for constructing an indications time-series from an observations time-series, and from that indications time-series, constructing and optimizing an attested state machine. In particular, starting with a time-series of observations:

$$\text{observations}=\{<t_0, v_0>, \ldots, <t_0+k*dt, v_k>\}$$

where $t_i$ is the time of the observation, dt is the interval between observations, and $v_i$ is the VALUE at time $t_i$ the corresponding time series of indications is defined by the rule $$\text{indications}=\{<t_0, (v_0 \geq \theta)>, \ldots, <t_0+k*dt, v_k > \theta>\}$$

where $<t_i, \text{true}>$ is in indications if and only if $v_i \geq \theta$, and $<t_i, \text{false}>$ is in indications if and only if $v_i < \theta$. (This is sometimes referred to as a transient event or potential event or single occurrence of an event.) (We assume the observations are separated by a constant interval for simplicity in presentation only—one skilled in the art will see clearly how to apply the current technique with variable intervals. The standard practice in metric-based monitoring is to use a constant interval between observations, however.) In turn, this time series of occurrences and non-occurrences (holes) is evaluated by a rule of the form if (occholes(O, H, i, . . . , i+O*H+1)) then RaiseAlert (eventName, eventData)

to identify a persistent event, one that has a sequence of occurrences and non-occurrences between times $t_i$ and $t_{i+O*H+1}$ that is consistent with the persistence requirements set forth by a specific setting of O's and H's. The function occholes(O, H, i, j) interprets the indications time series from time $t_i$ to time $t_j$ to determine if the interval contains "O" occurrences each separated by at most "H" holes, returning true if that situation occurs. Given a minimum detection and repair time expressed as the number of sampling cycles N, the optimization problem is the problem of finding the best <O,H> pair that satisfies the specific criteria (several options are suggested above) and the generic criteria O≧1, H≧0, and O*(H+1)≦N+O. (Further constraints may be imposed on O & H without deviating from the spirit of this invention.) We present two examples for clarity, but do not intend these examples to be limiting-those skilled in the relevant arts will appreciate the great variety of objective criteria that could be applied in a manner consistent with the invention.

EXAMPLE 1

Given a time-series of indications including both occurrences and holes, determine an optimized setting for occurrences O when the Minimum Feasible Repair Time is five (5) observation cycles and the required probability p=0.50. In this example, the number of allowed holes H=0. We state the computation in terms of a finite-state machine with states labeled according to the number of observation cycles, the number of occurrences, and the current number of holes:

| State <N, O, H> | Observations | Occurrences | Next state | Holes | Next state |
|---|---|---|---|---|---|
| <0, 0, 0> | 1000 | 100 | <1, 1, 0> | 900 | <0, 0, 0> |
| <1, 1, 0> | 100 | 30 | <2, 2, 0> | 70 | <0, 0, 0> |
| <2, 2, 0> | 30 | 18 | <3, 3, 0> | 12 | <0, 0, 0> |
| <3, 3, 0> | 18 | 17 | <4, 4, 0> | 1 | <0, 0, 0> |
| <4, 4, 0> | 17 | 16 | <5, 5, 0> | 1 | <0, 0, 0> |

This table shows the transition function δ which maps from a state and an observation (of either occurrence or hole type) to the destination state. This table also shows the number of observations that were used from the historical record to determine empirical probabilities (1000), the number of such observations that corresponded to initial occurrences (100) and the number of such observations that corresponded to initial holes (900). From this, it is clear that the empirical probability of a transition from state <0,0,0> to state <1,1,0> (representing the detection of a potentially persistent alert state) is 100/1000=0.10, where as the empirical probability of a transition from state <0,0,0> to itself is 900/1000=0.90. Similarly, of the 100 observations that led to state <1,1,0>, the empirical probability of a further transition to state <2,2,0> is 30/100=0.30, whereas the empirical probability of a further transition back to the initial state <0,0,0> is 70/100=0.70. Continuing from state <2,2,0>, the empirical probability of a transition to <3,3,0> is 18/30=0.60; from <3,3,0> to <4,4,0> is 17/18=0.94; from <4,4,0> to <5,5,0> is 16/17=0.94. From these figures, the probability of an eventual transition into <5,5,0> can be calculated from each state: the probability of a transition from <4,4,0> to <5,5,0> is 0.94; the probability of a transition from <3,3,0> to <5,5,0> is the probability of a transition from <3,3,0> to <4,4,0> followed by a transition from <4,4,0> to <5,5,0>, which is 0.94*0.94=0.88; from <2,2,0> to <5,5,0> is similarly 0.60*0.94*0.94=0.53; from <1,1,0> to <5,5,0> is 0.30*0.60*0.94*0.94=0.16. These probabilities allow us to read off the optimized setting for O as 2, because if an event persists through two observation cycles, the empirical probability of it persisting 5 or more cycles is 0.53, which is the smallest setting for O which gives an empirical probability above the required threshold of 0.50.

EXAMPLE 2

To demonstrate optimization of the number of holes as well, we allow H to be either 0 or 1, and extend the table from Example 1 from state <1,1,0>:

| State <N, O, H> | Observations | Occurrences | Next state | Holes | Next state |
|---|---|---|---|---|---|
| <0, 0, 0> | 1000 | 100 | <1, 1, 0> | 900 | <0, 0, 0> |
| <1, 1, 0> | 100 | 30 | <2, 2, 0> | 70 | *<2, 1, 1>* |
| *<2, 1, 1>* | *70* | *10* | *<3, 2, 0>* | *60* | *<0, 0, 0>* |
| *<3, 2, 0>* | *10* | *10* | *<4, 3, 0>* | *0* | *<0, 0, 0>* |
| *<4, 3, 0>* | *10* | *10* | *<5, 4, 0>* | *0* | *<0, 0, 0>* |
| <2, 2, 0> | 30 | 18 | <3, 3, 0> | 12 | <0, 0, 0> |
| <3, 3, 0> | 18 | 17 | <4, 4, 0> | 1 | <0, 0, 0> |
| <4, 4, 0> | 17 | 16 | <5, 5, 0> | 1 | <0, 0, 0> |

The italics mark differences from the original table. In this extended table, we see that the empirical probability of being in a state with a label <5, i, j> for some i>0 and j≦1 given that the state follows <3, 2, 0> is 100%; since it required O=2 and H=1 to reach that state and the empirical probability is above the required 0.50 level, an optimized O=2 and H=1 state is justified. The determination of whether to use <O,H>=<2,0> or <O,H>=<2,1> falls to additional criteria. Generally, the target outcome is the most permissive setting that meets the empirical probability, and in such case, we would choose <O,H>=<2,1>.

As Example 2 makes clear, once the problem allows optimization along multiple dimensions (e.g., occurrences and holes), the selection of a "best" setting becomes somewhat subjective. In certain circumstances, an <O,H>=<2,0> setting will be more appropriate than an <O,H>=<2,1> setting. As such, another aspect of the attested state machine is the designation, either by explicit stipulation or implicit description, of certain states as "accepting states"—transitions into these states would designate the detection of a persistent indication/event, or "true positives." These accepting states delimit the feasible <O,H> settings: O must be at least as large as the minimum number of occurrences counted in the accepting states, as designated by their labels; and H must be no larger than the maximum number of holes counted between the initial state and all paths to any accepting state. For concreteness, we stipulate a general method that takes the most permissive (largest) holes setting within the smallest occurrences setting that satisfies the minimum empirical probability requirement, although those skilled in the relevant arts will surely understand this as one of many possible choices rather than a critical step in the method.

Against this framework, it is reasonable to consider optimizing not just the occurrences & holes settings, but also the threshold θ. The optimization problem is a bit more complex to describe, since now the setting for one parameter (θ) changes the optimization problem for others (O & H). These nonlinear effects imply that many different tradeoffs are possible to describe and optimize towards. For illustrative but not limiting purposes, consider the use of a percentile basis for θ, and recast the optimization as being driven by a baseline rule in the form of:

if (VALUE>percentile(p, {<$t_0$, $v_0$>, . . . , <$t_N$, $v_N$>}) then RaiseAlert(eventName, eventData)

where percentile(p, time-series) returns the value at the $p^{th}$ percentile in the observed values. To constrain the optimization problem, in the additional notion of extrema detection is introduced to drive the eventual choice of p (and thereby θ). That is, it is assumed that the central tendency in the measurement stream represents "acceptable" or "normal," and that what is being detected is when the system is persistently behaving outside its acceptable, normal behavior. This is represented in the optimization problem by a new parameter, $p_{min}$, which is used to stipulate the cutoff for "normal." The simplest realization of this procedure simply uses the <O,H> optimization method unchanged except for the candidate θ setting used to construct the set indications, iterating through from $p_{min}$ to 99 in some manner (e.g., in 1 percentile units), recommending the largest setting for θ that corresponds to the optimized <O,H> setting. For example, if a setting of $p_{min}$=75 gave rise to an optimized <O,H>=<2,1> and θ=0.92 whereas $p_{min}$=80 also gave rise to <O,H>=<2,1> and θ=0.94, the optimized setting would be taken as θ=0.94.

Referring now to FIG. 2, a method flow diagram 100 according to the present invention is shown. First step S1 is to monitor indications of an event over time. As indicated above, this is accomplished based upon a comparison of a computer system metric to a corresponding metric threshold over time. In step S2, it is determined whether a predetermined probability is reached that the indications will persist at least as long as a minimum detection and repair time for the event. As indicated above, this determination is made based upon the monitoring of the indications over time and historical data for past instances of the event. If the predetermined probability is not reached, the event is not registered, as shown in step S3. However, if the predetermined probability is reached, an optimal filter setting for the event can be determined in step S4 such that the event will be registered (now and in the future) only when the predetermined probability is reached. Along these lines, the event can be registered in step S5. In step S6, the metric threshold by which indications are monitored can be optimized to further fine tune the process.

While shown and described herein as a method and system for optimizing event monitoring filters and metric thresholds, it is understood that the invention further provides various alternative embodiments. For example, in one embodiment, the invention provides a computer-readable medium that includes computer program code to enable a computer infrastructure to optimize event monitoring filters and metric thresholds. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to optimize event monitoring filters and metric thresholds as described above. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method of optimizing event monitoring filters and metric thresholds. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as monitoring system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method for optimizing event monitoring filter settings that is executed on a computer device, comprising:
   determining an optimal filter setting that is used for registering an event as requiring action at a time that is less than a configured detection and repair time for the event;
   monitoring, via a monitoring computer system, indications of the event over time at times less than the configured detection and repair time to determine, in response to each indication, a current computer system metric based upon a current total duration of time that the indications of the event have been occurring, where the current total duration of time is less than the configured detection and repair time, the indications being abnormal occurrences in operation of a computer system, and where the configured detection and repair time comprises a threshold amount of time historically required to both detect and repair the event;
   comparing the optimal filter setting against each determined current computer system metric; and
   determining whether the event is to be registered as requiring action based upon each comparison of the optimal filter setting against each determined current computer system metric.

2. The method of claim 1, where the optimal filter setting comprises a duration of time that represents a predetermined probability that additional indications of the event will persist at least as long as the configured detection and repair time for the event and the current computer system metric comprises the current total duration of time and where determining whether the event is to be registered as requiring action based upon each comparison of the optimal filter setting against each determined current computer system metric comprises:
   determining whether the predetermined probability is reached, based upon each comparison of the optimal filter setting against each determined current total duration of time, that the additional indications of the event will persist at least as long as the configured detection and repair time for the event, wherein the step of determining the optimal filter setting that is used for registering the event as requiring action at the time that is less than the configured detection and repair time for the event comprises determining the duration of time that is used for registering the event as requiring action at the time that is less than the configured detection and repair time for the event so that the event will be registered only if the predetermined probability is reached that the additional indications of the event will persist at least as long as the configured detection and repair time for the event.

3. The method of claim 2, wherein the step of determining whether the predetermined probability is reached is further based upon the monitoring of the indications over time and historical data for past instances of the event.

4. The method of claim 1, where the current computer system metric comprises a sum of occurrences and non-occurrences of the indications and wherein the step of determining the optimal filter setting that is used for registering the event as requiring action at the time that is less than the configured detection and repair time for the event comprises:
    determining the optimal filter setting such that the sum of occurrences and non-occurrences of the indications is less than or equal to a quotient of the configured detection and repair time and a time between samples for the event.

5. The method of claim 1, wherein the indications are monitored based upon a comparison of a computer system metric to a corresponding metric threshold over time.

6. The method of claim 5, further comprising optimizing the metric threshold based upon historical data for the indications.

7. The method of claim 1, wherein the optimal filter setting comprises a particular arrangement of occurrences and non-occurrences of the indications over time.

8. The method of claim 1, wherein the configured detection and repair time is obtained based on at least one of an approximation and a policy.

9. A method for optimizing event monitoring filter settings, comprising:
    determining an optimal filter setting that is used for registering an event as requiring action at a time that is less than a configured detection and repair time for the event, where the optimal filter setting comprises a duration of time that represents a predetermined probability that indications of the event will persist at least as long as the configured detection and repair time for the event;
    monitoring, via a monitoring computer system, the indications of the event based upon a comparison of a computer system metric to a corresponding metric threshold over time at times less than the configured detection and repair time to determine, in response to each indication, a current total duration of time that the indications of the event have been occurring, where the current total duration of time is less than the configured detection and repair time, the indications being abnormal occurrences in operation of a computer system, and where the configured detection and repair time comprises a threshold amount of time historically required to both detect and repair the event;
    comparing the optimal filter setting against each determined current total duration of time; and
    determining whether the predetermined probability is reached based upon each comparison of the optimal filter setting against each determined current total duration of time that additional indications of the event will persist at least as long as the configured detection and repair time for the event, wherein the step of determining whether the predetermined probability is reached is further based upon the monitoring of the indications of the event over time and historical data for past instances of the event, where the predetermined probability being reached indicates that the event is to be registered as requiring action.

10. A system for optimizing event monitoring filter settings, comprising:
    a memory that stores an event monitoring system, an event persistence system, and a filter optimization system; and
    a processor programmed to execute:
        the filter optimization system for determining an optimal filter setting that is used for registering an event as requiring action at a time that is less than a configured detection and repair time for the event so that the event will be registered as requiring action only if a predetermined probability is reached that indications of the event will persist at least as long as the configured detection and repair time for the event, where the optimal filter setting comprises a duration of time that represents the predetermined probability;
        the event monitoring system for:
            monitoring the indications of the event to determine, for each indication, a current total duration of time that the indications of the event have been occurring, where the current total duration of time is less than the configured detection and repair time, the indications being abnormal occurrences in operation of a computer system, and where the configured detection and repair time comprises a threshold amount of time historically required to both detect and repair the event; and
            comparing the optimal filter setting against each determined current total duration of time; and
        the event persistence system for determining whether the predetermined probability is reached based upon each comparison of the optimal filter setting against each determined current total duration of time that additional indications of the event will persist at least as long as the configured detection and repair time for the event, where the predetermined probability being reached indicates that the event is to be registered as requiring action.

11. The system of claim 10, wherein the event persistence system determines whether the predetermined probability is reached further based upon the monitoring of the indications over time and historical data for past instances of the event.

12. The system of claim 10, wherein the event monitoring system monitors the indications based upon a comparison of a computer system metric to a corresponding metric threshold over time.

13. The system of claim 12, where the memory further stores a metric optimization system and the processor further executes the metric optimization system for optimizing the metric threshold based upon historical data for the indications.

14. The system of claim 10, wherein the optimal filter setting comprises a particular arrangement of occurrences and non-occurrences of the indications over time.

15. The system of claim 10, where the memory further stores an event registration system and the processor further executes the event registration system for registering the event by communicating an event alert.

16. The system of claim 10, wherein the configured detection and repair time is determined based on an approximation.

17. The system of claim 10, wherein the configured detection and repair time is determined based on a policy.

18. A program product stored on a physical computer readable storage medium for optimizing event monitoring filter settings, the program product comprising program code for performing the following steps:

determining an optimal filter setting that is used for registering an event as requiring action at a time that is less than a configured detection and repair time for the event, where the optimal filter setting comprises a duration of time that represents a predetermined probability that indications of the event will persist at least as long as the configured detection and repair time for the event;

monitoring the indications of the event to determine, for each indication, a current total duration of time that the indications of the event have been occurring, where the current total duration of time is less than the configured detection and repair time, the indications being abnormal occurrences in operation of a computer system, and where the configured detection and repair time comprises a threshold amount of time historically required to both detect and repair the event;

comparing the optimal filter setting against each determined current total duration of time; and determining whether the predetermined probability is reached based upon each comparison of the optimal filter setting against each determined current total duration of time that additional indications of the event will persist at least as long as the configured detection and repair time for the event, where the predetermined probability being reached indicates that the event is to be registered as requiring action.

19. The program product of claim 18, wherein the determining of whether the predetermined probability is reached is further performed based upon the monitoring of the indications over time and historical data for past instances of the event.

20. The program product of claim 18, wherein the monitoring of the indications is based upon a comparison of a computer system metric to a corresponding metric threshold over time.

21. The program product of claim 20, wherein the program product further comprises program code for performing the following step: optimizing the metric threshold based upon historical data for the indications.

22. The program product of claim 18, wherein the optimal filter setting comprises a particular arrangement of occurrences and non-occurrences of the indications over time.

23. The program product of claim 18, wherein the program product further comprises program code for performing the following step: registering the event by communicating an event alert.

24. The program product of claim 18, wherein the configured detection and repair time is determined based on an approximation.

25. The program product of claim 18, wherein the configured detection and repair time is determined based on a policy.

26. A method for deploying an application for optimizing event monitoring filter settings, comprising:

providing a computer infrastructure being operable to:

determine an optimal filter setting that is used for registering an event as requiring action at a time that is less than a configured detection and repair time for the event, where the optimal filter setting comprises a duration of time that represents a predetermined probability that indications of the event will persist at least as long as the configured detection and repair time for the event;

monitor the indications of the event at times less than the configured detection and repair time to determine, in response to each indication, a current total duration of time that the indications of the event have been occurring, where the current total duration of time is less than the configured detection and repair time, the indications being abnormal occurrences in operation of a computer system, and where the configured detection and repair time comprises a threshold amount of time historically required to both detect and repair the event;

compare the optimal filter setting against each determined current total duration of time; and determine whether the predetermined probability is reached based upon each comparison of the optimal filter setting against each determined current total duration of time that additional indications of the event will persist at least as long as the configured detection and repair time for the event, where the predetermined probability being reached indicates that the event is to be registered as requiring action.

27. The method of claim 26, wherein determining whether the predetermined probability is reached is further based upon the monitoring of the indications over time and historical data for past instances of the event, and wherein the indications are monitored based upon a comparison of a computer system metric to a corresponding metric threshold over time.

\* \* \* \* \*